United States Patent
Forcier et al.

(10) Patent No.: US 10,107,206 B2
(45) Date of Patent: Oct. 23, 2018

(54) HIGH PRESSURE COMPRESSOR ROTOR THERMAL CONDITIONING USING DISCHARGE PRESSURE AIR

(71) Applicant: UNITED TECHNOLOGIES CORPORATION, Hartford, CT (US)

(72) Inventors: Matthew P. Forcier, South Windsor, CT (US); Paul J. Hiester, Glastonbury, CT (US); Andrew J. Murphy, Old Saybrook, CT (US)

(73) Assignee: United Technologies Corporation, Farmington, CT (US)

( * ) Notice: Subject to any disclaimer, the term of this patent is extended or adjusted under 35 U.S.C. 154(b) by 272 days.

(21) Appl. No.: 14/878,018

(22) Filed: Oct. 8, 2015

(65) Prior Publication Data
US 2016/0123234 A1 May 5, 2016

Related U.S. Application Data

(60) Provisional application No. 62/075,281, filed on Nov. 5, 2014.

(51) Int. Cl.
*F01D 5/08* (2006.01)
*F02C 9/18* (2006.01)
(Continued)

(52) U.S. Cl.
CPC ............ *F02C 9/18* (2013.01); *F01D 5/087* (2013.01); *F01D 19/02* (2013.01); *F02C 3/04* (2013.01);
(Continued)

(58) Field of Classification Search
CPC ...... F02C 9/18; F02C 3/04; F02C 6/08; F02C 7/185; F01D 5/087; F01D 19/02; F04D 29/324; F05D 2260/213
See application file for complete search history.

(56) References Cited

U.S. PATENT DOCUMENTS 4,576,547 A * 3/1986 Weiner .................... F01D 11/24
                                                                                   415/116
6,267,553 B1     7/2001 Burge
(Continued)

FOREIGN PATENT DOCUMENTS

| EP | 0141770 A1 | 5/1985 |
|---|---|---|
| EP | 2206884 A2 | 7/2010 |
| EP | 2604825 A2 | 6/2013 |

OTHER PUBLICATIONS

European Search Report for European Application No. 15192939.5 dated Mar. 23, 2016.

*Primary Examiner* — Ninh H Nguyen
(74) *Attorney, Agent, or Firm* — Carlson, Gaskey & Olds, P.C.

(57) ABSTRACT

A compressor for use in a gas turbine engine comprises a compressor rotor including blades and a disc, with a bore defined radially inwardly of the disc. A high pressure air tap includes a lower temperature tapped path and a higher temperature tapped path and a valve for selectively delivering one of the lower temperature tapped path and the higher temperature tapped path into the bore of the disc. The valve is operable to selectively block flow of either of the lower pressure and higher pressure tapped paths to the bore of the disc, with the disc including holes to allow air from compressor chambers to communicate with the bore of the disc. A gas turbine engine and a method of operating a gas turbine engine are also disclosed.

19 Claims, 5 Drawing Sheets

(51) Int. Cl.
     *F04D 29/32*    (2006.01)
     *F02C 3/04*    (2006.01)
     *F01D 19/02*    (2006.01)
     *F02C 6/08*    (2006.01)
     *F02C 7/18*    (2006.01)

(52) U.S. Cl.
     CPC ............... *F02C 6/08* (2013.01); *F02C 7/185* (2013.01); *F04D 29/324* (2013.01); *F05D 2220/32* (2013.01); *F05D 2220/323* (2013.01); *F05D 2240/20* (2013.01); *F05D 2240/35* (2013.01); *F05D 2260/213* (2013.01); *F05D 2270/114* (2013.01); *Y02T 50/676* (2013.01)

(56) References Cited

U.S. PATENT DOCUMENTS

| | | | |
|---|---|---|---|
| 2010/0178168 A1* | 7/2010 | Desai | ............... F01D 5/082 416/95 |
| 2011/0129332 A1 | 6/2011 | Behaghel et al. | |
| 2013/0192253 A1 | 8/2013 | Ackermann et al. | |
| 2013/0323010 A1 | 12/2013 | Mosley et al. | |

\* cited by examiner

US 10,107,206 B2

HIGH PRESSURE COMPRESSOR ROTOR THERMAL CONDITIONING USING DISCHARGE PRESSURE AIR

CROSS REFERENCE TO RELATED APPLICATION

This application claims priority to U.S. Provisional Application No. 62/075,281 which was filed on Nov. 5, 2014.

BACKGROUND OF THE INVENTION

This application relates to extracting compressed air for thermal conditioning of a high pressure compressor rotor.

Gas turbine engines used on aircraft typically include a fan delivering air into a bypass duct and into a compressor section. Air from the compressor is passed downstream into a combustion section where it is mixed with fuel and ignited. Products of this combustion pass downstream over turbine rotors driving them to rotate.

Turbine rotors drive compressor and fan rotors. Historically, the fan rotor was driven at the same speed as a turbine rotor. More recently, it has been proposed to include a gear reduction between the fan rotor and a fan drive turbine. With this change, the diameter of the fan has increased dramatically and a bypass ratio or volume of air delivered into the bypass duct compared to a volume delivered into the compressor has increased. With this increase in bypass ratio, it becomes more important to efficiently utilize the air that is delivered into the compressor.

One factor that increases the efficiency of the use of this air is to have a higher pressure at the exit of a high pressure compressor. This high pressure results in a high temperature increase. The temperature at the exit of the high pressure compressor is known as $T_3$ in the art.

There is a stress challenge to increasing $T_3$ on a steady state basis due largely to material property limits called "allowable stress" at a given maximum $T_3$ level. At the maximum, a further increase in a design $T_3$ presents challenges to achieve a goal disk life. In particular, as the design $T_3$ is elevated, a transient stress in the disk increases. This is true since the radially outer portions of a high pressure compressor rotor (i.e., the blades and outermost surfaces of the disk or blisk), which are in the path of air, see an increased heat rapidly during a rapid power increase. Such an increase occurs, for example, when the pilot increases power during a take-off roll. However, a rotor disk bore does not see the increased heat as immediately. Similar high stresses occur with a change from high power back to low, when the outer rim cools more quickly than the rotor bore. Thus, there are severe stresses due to the thermal gradient between the disk bore and the outer rim region.

Thermal gradient challenges are greatest during large changes in power setting. For instance, when an associated aircraft moves from idle to take-off, or cruise to decent. It is possible that the thermal stress in the disk is much greater than the stress due to the centrifugal force on the disk. The engine has typically been at low speed or idle as the aircraft waits on the ground and then, just before take-off, the speed of the engine is increased dramatically. Disk thermal gradient stresses may result in a compressor design that cannot achieve desired pressures.

SUMMARY OF THE INVENTION

In a featured embodiment, a compressor for use in a gas turbine engine comprises a compressor rotor including blades and a disc, with a bore defined radially inwardly of the disc. A high pressure air tap includes a lower temperature tapped path and a higher temperature tapped path and a valve for selectively delivering one of the lower temperature tapped path and the higher temperature tapped path into the bore of the disc. The valve is operable to selectively block flow of either of the lower pressure and higher pressure tapped paths to the bore of the disc, with the disc including holes to allow air from compressor chambers to communicate with the bore of the disc.

In another embodiment according to the previous embodiment, the lower temperature tapped path passes through a heat exchanger before reaching the valve.

In another embodiment according to any of the previous embodiments, the valve allows flow from the higher temperature tapped path when the associated engine is moving from a lower power operation to a higher power operation.

In another embodiment according to any of the previous embodiments, the valve delivers the lower temperature tapped path to the bore of the disc when the engine is at higher power operation.

In another embodiment according to any of the previous embodiments, the valve blocks flow of both the higher pressure and lower pressure tapped paths when the engine is operating at other lower power settings.

In another embodiment according to any of the previous embodiments, air from the compressor chamber passes radially inwardly through the holes in the disc, and into the bore of the disc when the valve blocks flow of both the higher pressure and lower pressure paths.

In another embodiment according to any of the previous embodiments, the valve communicates the higher temperature tap path radially inwardly of the blades, through the disc, and into the bore when the engine is operating at other lower power settings.

In another embodiment according to any of the previous embodiments, a seal blocks flow of air at a radially inner portion of the compressor section from passing upstream.

In another featured embodiment, a gas turbine engine comprises a compressor section, a combustor, and a turbine section. The compressor section includes a compressor rotor including blades and a disc, with a bore defined radially inwardly of the disc. A high pressure air tap includes a lower temperature tapped path and a higher temperature tapped path and a valve for selectively delivering one of the lower temperature tapped path and the higher temperature tapped path into the bore of the disc. The valve is operable to selectively block flow of either of the lower pressure and higher pressure tapped paths to the bore of the disc, with the disc including holes to allow air from compressor chambers to communicate with the bore of the disc.

In another embodiment according to the previous embodiment, the lower temperature tapped path passes through a heat exchanger before reaching the valve.

In another embodiment according to any of the previous embodiments, the valve allows flow from the higher temperature tapped path when the associated engine is moving from a lower power operation to a higher power operation.

In another embodiment according to any of the previous embodiments, the valve delivers the lower temperature tapped path to the bore of the disc when the engine is at higher power operation.

In another embodiment according to any of the previous embodiments, the valve blocks flow of both the higher pressure and lower pressure tapped paths when the engine is operating at other lower power settings.

In another embodiment according to any of the previous embodiments, air from the compressor chamber passes radially inwardly through the holes in the disc, and into the bore of the disc when the valve blocks flow of both the higher pressure and lower pressure paths.

In another embodiment according to any of the previous embodiments, the valve communicates the higher temperature tap path radially inwardly of the blades, through the disc, and into the bore when the engine is operating at other lower power settings.

In another embodiment according to any of the previous embodiments, a seal blocks flow of air at a radially inner portion of the compressor section from passing upstream.

In another featured embodiment, a method of operating a gas turbine engine includes the steps of tapping air from a compressor section exit, the compressor section having a rotor including blades and a disc, with a bore defined radially inwardly of the disc. The high pressure air tap includes a lower temperature tapped path and a higher temperature tapped path and a valve selectively delivering one of the lower temperature tapped path and the higher temperature tapped path into the bore of the disc. The valve selectively blocks flow of either, or both, of the lower pressure and higher pressure tapped paths to the bore of the disc.

In another embodiment according to the previous embodiment, the lower temperature tapped path passes through a heat exchanger before reaching the valve.

In another embodiment according to any of the previous embodiments, air from the compressor chamber passes radially inwardly through holes in the disc, and into the bore of the disc when the valve blocks flow of both the higher pressure and lower pressure paths.

In another embodiment according to any of the previous embodiments, the valve communicates the higher temperature tap path radially inwardly of the blades, through the disc, and into the bore when the engine is operating at some lower power settings.

These and other features may be best understood from the following drawings and specification.

DETAILED DESCRIPTION

Figure 1:
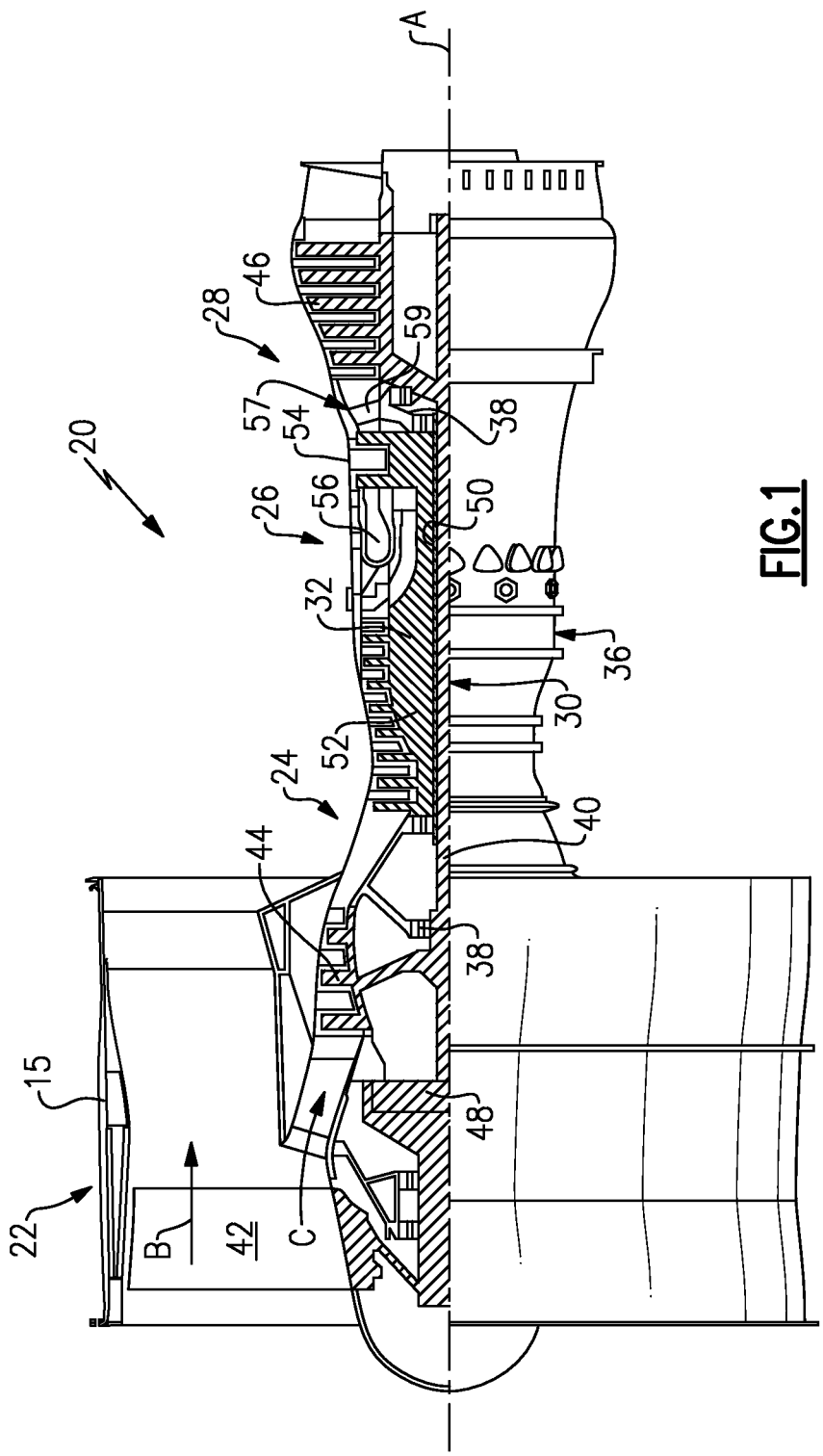
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2A:
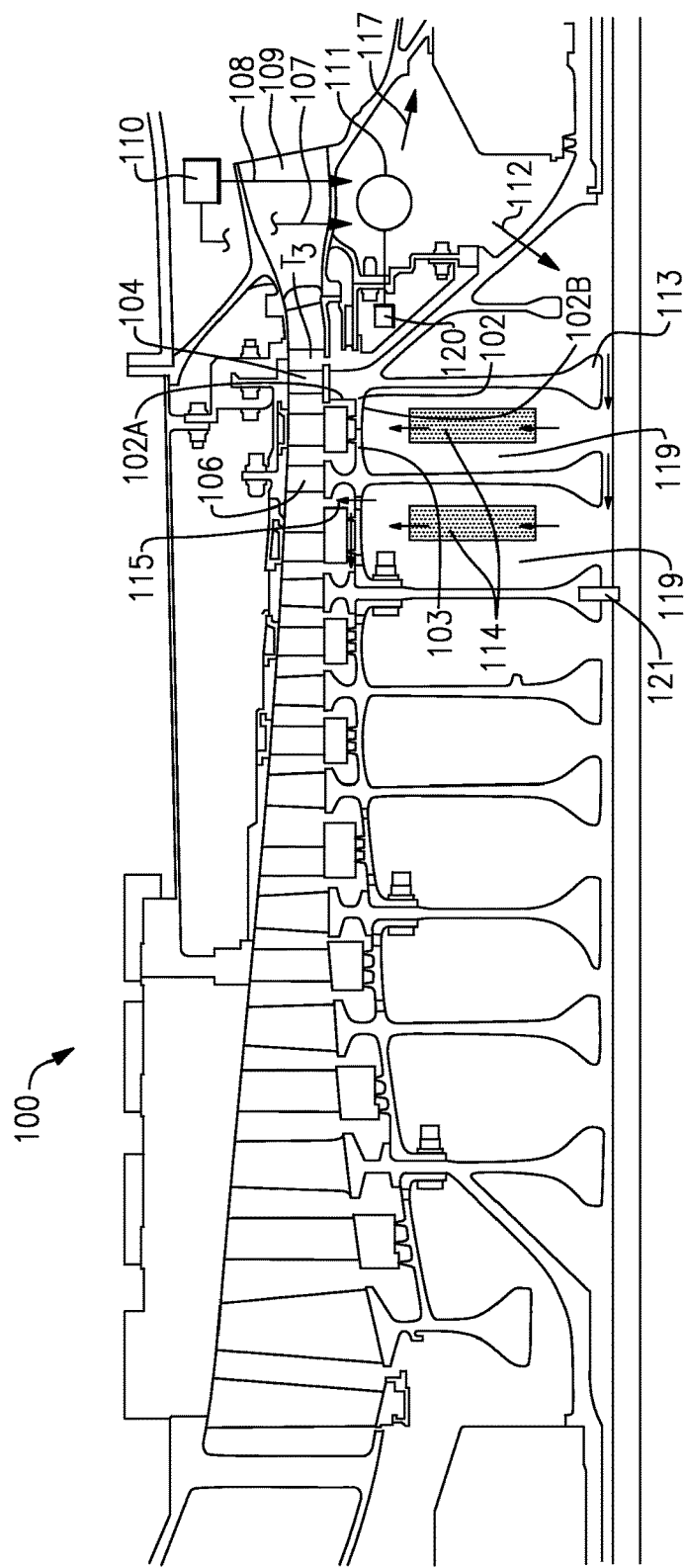
FIG. 2A shows details of a compressor section in a first condition.

FIG. 2A shows a high pressure compressor section 100. While a number of stages are illustrated, this disclosure focuses on the most downstream stages. Hubs or discs 102 and 103 are shown mounting a pair of blades 104 and 106. As known, a temperature $T_3$ is defined downstream of an end blade 104. As mentioned above, it is desirable to increase the $T_3$, however, there are real world challenges in doing so. In particular, the temperatures of the compressed air being moved by the blades 104 and 106 heats the outer peripheral portions (such as the outer rim surface 102A) of the high pressure compressor 100 much more rapidly than bores 102B of the discs 102 and 103 heat. This can cause challenges as mentioned above.

In the past, air has been tapped from the compressor stages radially inwardly through the disc at upstream locations and delivered to preheat the downstream areas, such as bores of the discs 102 and 103. However, tapping the air radially inwardly through the hub decreases the pressure and, thus, the efficiency of the preheating. This becomes particularly acute as one moves to more downstream locations, such as the discs 102 and 103.

As shown in FIG. 2A, the compressor 100 has two air taps 107 and 108 which are taken from the compressor exit 109. Air tap 108 passes through a heat exchanger 110 where the air is cooled. Thus, air tap 107 is a non-cooled high pressure air that will be at a higher temperature than the air in tap 108 which is a cooler high pressure air. Both taps 107 and 108 pass to a valve 111. Downstream of the valve 111, the air may flow, as shown at 112, radially inwardly of an inner end 113 of the hubs 102 and 103 and then through anti-vortex tubes 114, and holes 115 in the hubs 102 and 103. In this configuration, flowing radially outward, tubes 114 serve to increase the pressure of the flow like a centrifugal compressor. The air also flows, as shown at 117, to cool the turbine section (see FIG. 1).

The vortex tubes 114 are positioned in chambers 119. The chambers 119 are desirably preheated during certain conditions to address the stresses as mentioned above. FIG. 2A shows an initial transition from a low power setting as the engine anticipates moving to a high power setting, such as takeoff. A control 120 for the valve 111 moves the valve such that majority of the air, if not all of the air, delivered into the chambers 119 is the non-cooled higher temperature air from tap 107. The air passing into the chambers 119 and through the anti-vortex tubes 114 preheats the hubs 102 and 103.

In fact, the valve 111 would likely have initially been in this position during idle and taxi, so that valve movement may not actually be required prior to the FIG. 2A time. The valve 111 may stay in the FIG. 2A position for a portion of time after the engine is transitioning to a higher power setting.

A seal 121 blocks the flow of air to more upstream locations, such that it is directed to the chambers 119.

As can be appreciated, the flow paths shown in this figure are relatively schematic. An appropriate valve and communication structure would be well within the ability of a worker in the art, given the disclosure.

Figure 2B:
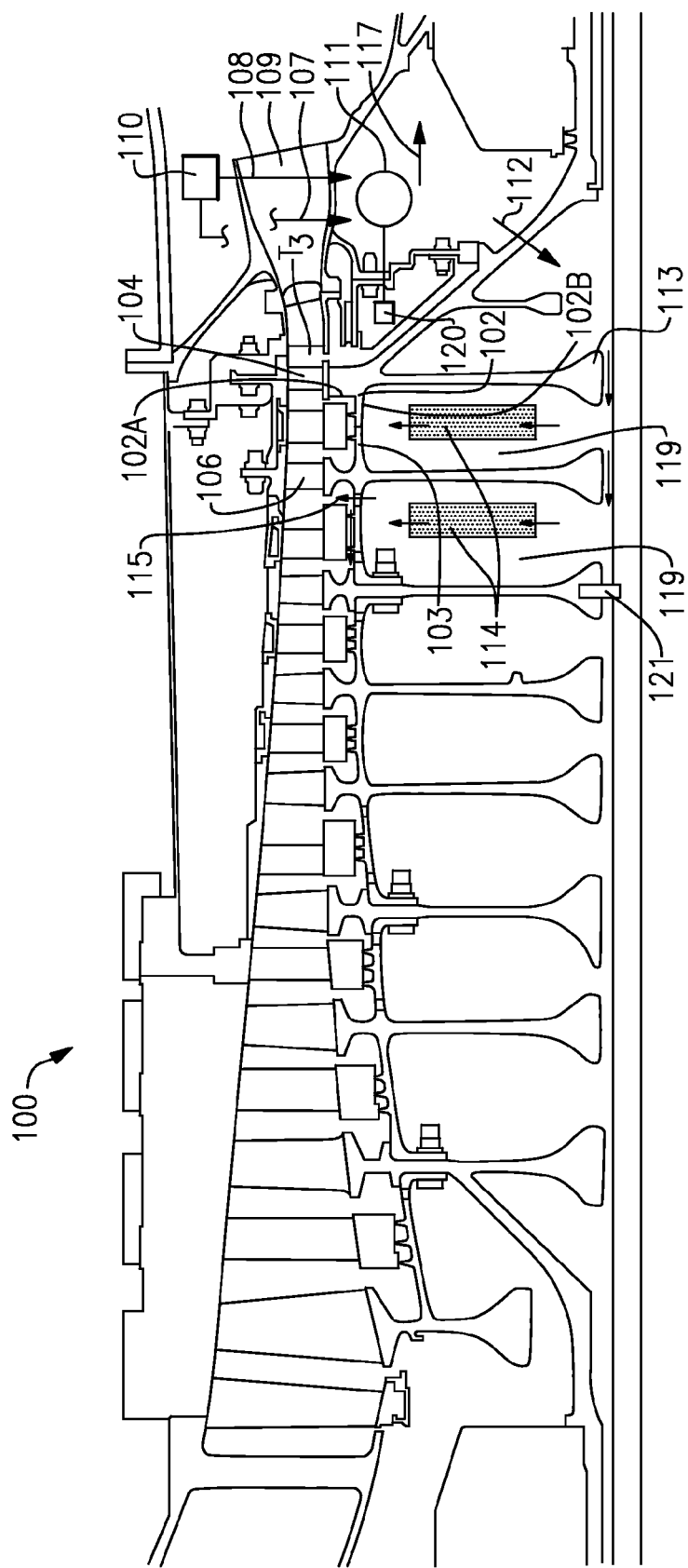
FIG. 2B shows the FIG. 2 compressor section in a second operational condition.

FIG. 2B shows the operation at higher temperature power settings, such as takeoff through climb, for example. In this position, the control 120 has moved the valve 117 such that the air delivered to 112 inwardly of radially inner end 113, vortex tubes 114 and chambers 119 and holes 115 is now the cooled high pressure air from tap 108. At the higher pressure settings, cooling is desirably provided.

As mentioned above, the change from FIG. 2A to FIG. 2B may not occur simultaneously with the beginning of the higher power operation of the associated engine. Instead, there may be a short duration of time at high power before the valve moves to the FIG. 2B position.

Figure 2C:
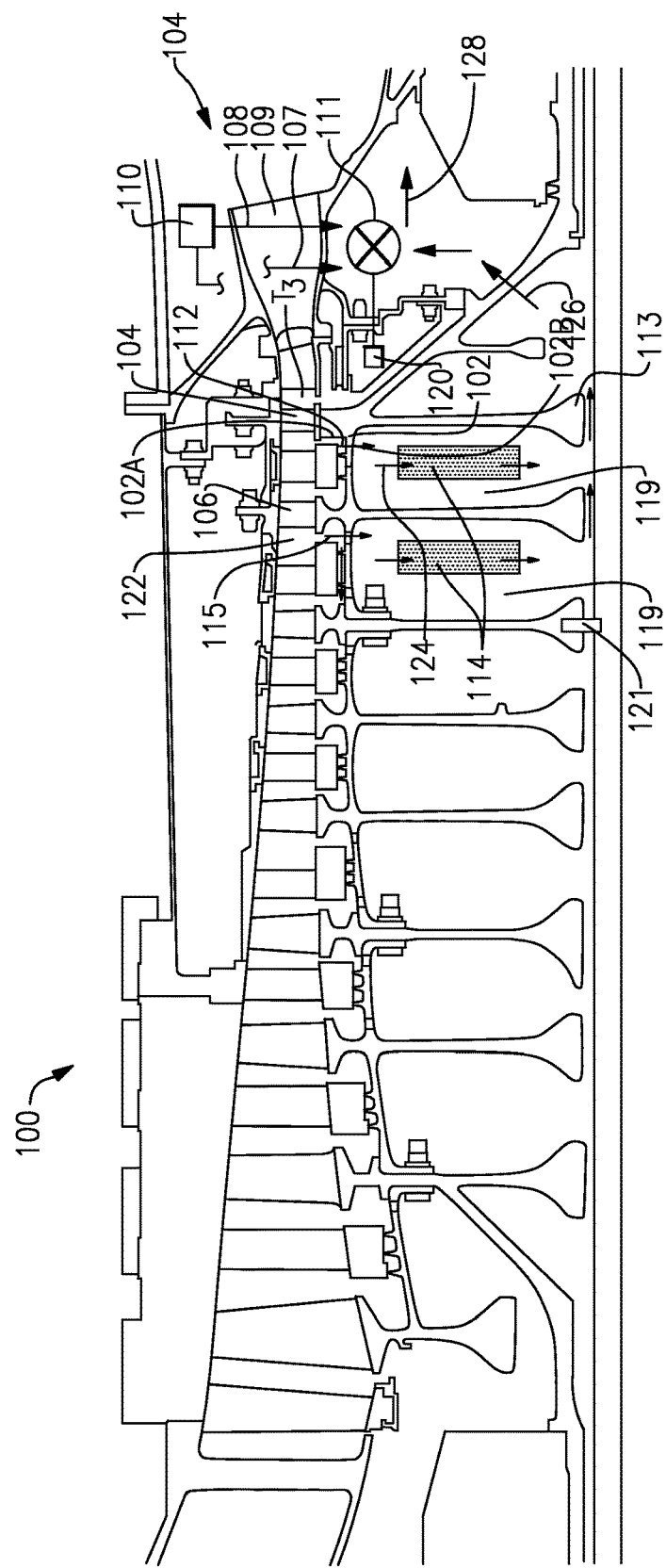
FIG. 2C shows the FIG. 2 compressor section in a third operational condition.

FIG. 2C shows operation at stabilized low temperature power settings, such as cruise, In the FIG. 2C position, the control 120 has moved the valve 111 such that it blocks flow from both taps 107 and 108. In this position, air may pass from the holes 115, but now radially inwardly from compressor chambers 122 and into the chambers 119. The air flows as shown at 124 through the vortex tubes 114, along the radially inner end 113 of the compressor, and as shown at 126 and 128 passes downstream toward the turbine section. This provides more efficient operation in that the high pressure compressed air is not taken through the valve 111 in this position. The efficiency benefit is because the air is being extracted at a lower pressure compressor location. The flow is thus sourced from a less expensive stage/location.

Thus, this embodiment reverses the flow of air such that under certain conditions and, typically, conditions leading up to high power and high power, a high pressure air source is passed through a valve 111 and then radially outward to activate chambers 119 and pre-condition the rotor disks 102B. At lower power settings, the air passes radially inwardly through the compressor chambers 122 into the chambers 119.

Figure 3:
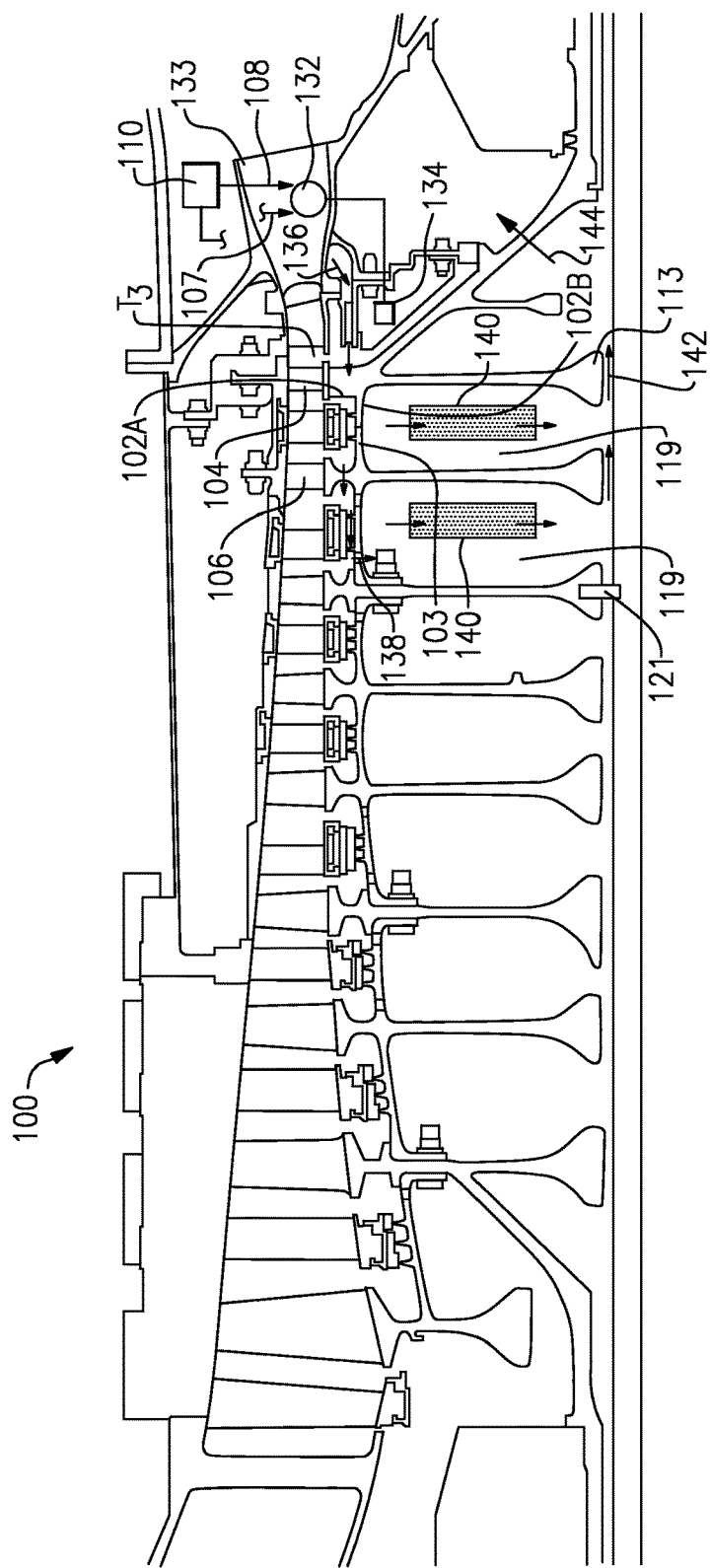
FIG. 3 shows a second embodiment of the third operational condition

FIG. 3 shows another embodiment 130. Embodiment 130 operates in the FIGS. 2A and 2B conditions in a similar fashion. That is, the FIG. 3 valve would communicate the hot air source 107 inwardly, and to preheat the chambers 119, as in the FIG. 2A operation. Again, at some point, the valve 132 would then be moved to communicate the air source 108 to the chambers inwardly to the chambers 119. As in the prior embodiment, the change may happen shortly after being moved to high power operation of the associated engine.

However, in the condition shown in FIG. 2C, the embodiment 130 operates differently from the embodiments of FIGS. 2A-2C. Here, the control 134 directs at least the hotter air source 107 through a valve 132 that may be actually mounted in the compressor exit 133. The control 134 may move the valve to tap the air as shown at 136 radially inward of the blades 104 and 106. The air then passes through the ports 138 in the hubs 102 and 103, and into anti-vortex tubes 140 before passing along the inner periphery at 142, and to the turbine at 144.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A compressor for use in a gas turbine engine comprising:
   a compressor rotor including blades in at least one compressor chamber and a disc, with a bore defined radially inwardly of said disc; and
   a high pressure air tap including a lower temperature tapped path and a higher temperature tapped path and a valve for selectively delivering one of said lower temperature tapped path and said higher temperature tapped path into said bore of said disc, and said valve being operable to selectively block flow of either of said lower temperature and higher temperature tapped paths to said bore of said disc, with said disc including holes to allow air from said at least one compressor chamber to communicate with said bore of said disc.

2. The compressor as set forth in claim 1, wherein said lower temperature tapped path passes through a heat exchanger before reaching said valve.

3. The compressor as set forth in claim 1, wherein said valve allows flow from said higher temperature tapped path when the associated engine is moving from a lower power operation to a higher power operation.

4. The compressor as set forth in claim 3, wherein said valve delivers said lower temperature tapped path to said bore of said disc when said engine is at higher power operation.

5. The compressor as set forth in claim 4, wherein said valve blocks flow of both said higher temperature and lower temperature tapped paths when said engine is operating at other lower power settings.

6. The compressor as set forth in claim 5, wherein air from the compressor chamber passes radially inwardly through the holes in said disc, and into said bore of said disc when said valve blocks flow of both said higher temperature tapped path and said lower temperature tapped path.

7. The compressor as set forth in claim 4, wherein said valve communicates said higher temperature tap path radially inwardly of said blades, through said disc, and into said bore when said engine is operating at other lower power settings.

8. The compressor as set forth in claim 1, wherein a seal blocks flow of air at a radially inner portion of said compressor section from passing upstream.

9. A gas turbine engine comprising:
   a compressor section, a combustor, and a turbine section;
   said compressor section including a compressor rotor including blades in at least one compressor chamber and a disc, with a bore defined radially inwardly of said disc; and
   a high pressure air tap including a lower temperature tapped path and a higher temperature tapped path and a valve for selectively delivering one of said lower temperature tapped path and said higher temperature tapped path into said bore of said disc, and said valve being operable to selectively block flow of either of said lower temperature tapped path and said higher temperature tapped path to said bore of said disc, with said disc including holes to allow air from said at least one compressor chamber to communicate with said bore of said disc.

10. The gas turbine engine as set forth in claim 9, wherein said lower temperature tapped path passes through a heat exchanger before reaching said valve.

11. The gas turbine engine as set forth in claim 9, wherein said valve allows flow from said higher temperature tapped path when the associated engine is moving from a lower power operation to a higher power operation.

12. The gas turbine engine as set forth in claim 11, wherein said valve delivers said lower temperature tapped path to said bore of said disc when said engine is at higher power operation.

13. The gas turbine engine as set forth in claim 12, wherein said valve blocks flow of both said higher temperature and lower temperature tapped paths when said engine is operating at other lower power settings.

14. The gas turbine engine as set forth in claim 13, wherein air from the compressor chamber passes radially inwardly through the holes in said disc, and into said bore of said disc when said valve blocks flow of both said higher temperature tapped path and said lower temperature tapped path.

15. The gas turbine engine as set forth in claim 12, wherein said valve communicates said higher temperature tap path radially inwardly of said blades, through said disc, and into said bore when said engine is operating at other lower power settings.

16. The gas turbine engine as set forth in claim 9, wherein a seal blocks flow of air at a radially inner portion of said compressor section from passing upstream.

17. A method of operating a gas turbine engine including the steps of:
   tapping air from a compressor section exit, the compressor section having a rotor including blades in at least one compressor chamber and a disc, with a bore defined radially inwardly of said disc;
   the high pressure air tap including a lower temperature tapped path and a higher temperature tapped path and a valve selectively delivering one of said lower temperature tapped path and said higher temperature tapped path into said bore of said disc, and said valve selectively blocking flow of either, or both, of said lower temperature tapped path and said higher temperature tapped paths to said bore of said disc; and
   wherein air from the at least one compressor chamber passes radially inwardly through holes in said disc, and into said bore of said disc when said valve blocks flow of both said higher pressure and lower pressure paths.

18. The method as set forth in claim 17, wherein said lower temperature tapped path passes through a heat exchanger before reaching said valve.

19. The method as set forth in claim 17, wherein said valve communicates said higher temperature tap path radially inwardly of said blades, through said disc, and into said bore when said engine is operating at some lower power settings.

* * * * *